(12) United States Patent
Koskelainen et al.

(10) Patent No.: US 7,328,046 B2
(45) Date of Patent: Feb. 5, 2008

(54) COMMUNICATION SYSTEM

(75) Inventors: Petri Koskelainen, Tampere (FI); Risto Kauppinen, Helsinki (FI); Jaakko Rajaniemi, Helsinki (FI)

(73) Assignee: Nokia Corporation, Espoo (FI)

( * ) Notice: Subject to any disclaimer, the term of this patent is extended or adjusted under 35 U.S.C. 154(b) by 160 days.

(21) Appl. No.: 10/467,722

(22) PCT Filed: Feb. 13, 2002

(86) PCT No.: PCT/IB02/00952

§ 371 (c)(1),
(2), (4) Date: Oct. 14, 2003

(87) PCT Pub. No.: WO02/082849

PCT Pub. Date: Oct. 17, 2002

(65) Prior Publication Data

US 2004/0110535 A1    Jun. 10, 2004

(30) Foreign Application Priority Data

Feb. 22, 2001 (GB) .................................. 0104446.0

(51) Int. Cl.
*H04M 1/00* (2006.01)

(52) U.S. Cl. ............. 455/561; 455/433; 455/435; 455/424

(58) Field of Classification Search ............ 455/561, 455/433, 424, 426.1–2, 428, 435.1, 445, 455/434, 435
See application file for complete search history.

(56) References Cited

U.S. PATENT DOCUMENTS

| 4,313,035 A | | 1/1982 | Jordan et al. | |
|---|---|---|---|---|
| 5,600,641 A | * | 2/1997 | Duault et al. | 370/400 |
| 5,901,352 A | * | 5/1999 | St-Pierre et al. | 455/426.1 |
| 6,064,887 A | * | 5/2000 | Kallioniemi et al. | 455/445 |
| 6,236,853 B1 | * | 5/2001 | Mee et al. | 455/414.1 |
| 6,243,739 B1 | * | 6/2001 | Schwartz et al. | 709/206 |
| 6,289,212 B1 | * | 9/2001 | Stein et al. | 455/412.1 |
| 6,374,079 B1 | * | 4/2002 | Hsu | 455/11.1 |
| 6,452,924 B1 | * | 9/2002 | Golden et al. | 370/352 |
| 6,526,273 B1 | * | 2/2003 | Link, II et al. | 455/406 |
| 6,529,589 B1 | * | 3/2003 | Nelson et al. | 379/102.01 |
| 6,625,456 B1 | * | 9/2003 | Busso et al. | 455/456.2 |
| 6,647,260 B2 | * | 11/2003 | Dusse et al. | 455/419 |
| 6,747,970 B1 | * | 6/2004 | Lamb et al. | 370/352 |
| 6,856,804 B1 | * | 2/2005 | Ciotta | 455/435.1 |

(Continued)

FOREIGN PATENT DOCUMENTS

EP    1 146 754 A1    4/2000

(Continued)

*Primary Examiner*—CongVan Tran
(74) *Attorney, Agent, or Firm*—Cohen Pontani Lieberman & Pavane LLP

(57) ABSTRACT

A communication system and a method and a server for a communication system is disclosed. The communication system comprises communication means for providing communication media for a plurality of user equipment, a storage entity (21) adapted to store information that associates with at least one of said user equipment, and at least one service provision entity (28) adapted to serve a client based on information stored in said storage entity. The storage entity (21) is arranged to receive information associated with the user equipment from other entities (22, 23) and to associate said received information with a respective user equipment.

22 Claims, 4 Drawing Sheets

U.S. PATENT DOCUMENTS

| | | |
|---|---|---|
| 6,871,236 B2 * | 3/2005 | Fishman et al. ............. 709/246 |
| 7,072,452 B1 * | 7/2006 | Roberts et al. .......... 379/88.23 |
| 2001/0014911 A1 * | 8/2001 | Doi et al. ................... 709/221 |
| 2002/0072347 A1 * | 6/2002 | Dunko et al. ............... 455/404 |
| 2002/0077157 A1 * | 6/2002 | Okun et al. ................. 455/567 |
| 2002/0095474 A1 * | 7/2002 | Boys .......................... 709/217 |

FOREIGN PATENT DOCUMENTS

| | | |
|---|---|---|
| EP | 1 071 295 A2 | 1/2001 |
| GB | 2 317 305 A | 3/1998 |
| GB | 2 363 289 A | 12/2001 |
| GB | 2 367 451 A | 4/2002 |
| WO | WO 98/37724 | 8/1998 |
| WO | WO 99/20065 | 4/1999 |
| WO | WO 00/51391 | 8/2000 |
| WO | WO 01/78425 A1 | 10/2001 |

* cited by examiner

COMMUNICATION SYSTEM

PRIORITY CLAIM

This is a national stage of PCT application No. PCT/IB02/00952, filed on Feb. 13, 2002. Priority is claimed on that application and on Application Ser. No. 0104446.0, filed in Finland on Feb. 22, 2001.

FIELD OF THE INVENTION

The present invention relates to a communication system, and particular, but not exclusively, to provision of information that associates with an equipment in communication via the system and/or with communication between a least two entities of the system.

BACKGROUND OF THE INVENTION

Communication systems are known. A communication system enables communication between two or more entities such as user equipment and/or nodes implemented in the system. Communication systems typically operate in accordance with a given standard or specification which sets out what the various elements of the system are permitted to do and how that should be achieved. For example, the standard or specification may define if the user, or more precisely, user equipment or terminal is provided with a circuit switched service and/or a packet switched service. Communication protocols and/or parameters which shall be used for the connection may also be defined. In other words, a specific set of "rules" on which the communication can be based on needs to be defined to enable communication in the system.

Communication systems proving wireless communication for the user terminals or other nodes are also known. An example of the wireless systems is a cellular network. In cellular systems, a base transceiver station (BTS) or similar serves mobile stations (NS) or similar wireless user equipment (UE) via an air or radio interface between these entities. A base station provides a radio access entity that is typically but not exclusively referred to as a cell. The operation of the base station apparatus and other apparatus required for the communication can be controlled by one or several control entities. The various control entities may be interconnected. One or more gateway nodes may also be provided for connecting the cellular network to another networks, e.g. to a public switched telephone network (PSTN) and other communication networks such as an IP (Internet Protocol) and/or other packet switched networks.

A cellular communication system may be adapted to provide packet switched (PS) services for a mobile station. Examples of systems enabling packet switched services include the General Packet Radio Service (GPRS), the Enhanced Data rate for GSM Evolution (EDGE) mobile data network, the third generation (3G) telecommunication systems such as the Universal Mobile Telecommunication System (UMTS), i-phone or IMT-2000 (International Mobile Telecommunications) and the TErrestrial Trunked Radio (TETRA) system.

For example, in the current third generation (3G) architectures it is assumed that several different servers are used for handling functions required by various stages of processing of communication between two entities. These functions include different call state control functions (CSCFs) such as a proxy call stare control function (P-CSCF), interrogating call state control function (I-CSCF), and serving call state control function (S-CSCF). Control functions may also be provided by entities such as a home subscriber server (HSS) and various application servers. From the above mentioned servers the home subscriber server HSS is for storing subscriber relates information such as the registration identities (ID) of the subscriber or the terminals and so on. The home subscriber server HSS can be queried by other function entities during call or other session set-up procedures, e.g. for locating a subscriber. The term "session" refers to any communication such as to a call communication, data communication (e.g. web browsing) an so on.

However, the home subscriber server does not store dynamically any call related information or other information that relates to the status of a subscriber. In particular, the current network system are not provided with means for storing dynamically call related information or other information that relates to the status of a subscriber. For example, the home subscriber server HSS does not provide indication whether a subscriber is busy. Furthermore, e.g. in the packet switched environment a subscriber may have simultaneously one or more multimedia connections that are handled by different and from each other independent servers. The home subscriber server does not know if the subscriber is already having one or more of multimedia connections.

However, various network entities and/or services or other users may require information regarding the status of a certain subscriber or a call for their operation. An example of such a service/entity is the so called presence service/presence server.

In addition to "internal" clients, i.e. entities that are located within the network, the status information could be found useful by external clients. A client could be, for example, an user of a terminal or an entity that belongs to another network. For example, a user may want to know the status (e.g. availability) of another user (B-party). The user may find this information useful e.g. before trying to make a call to the B-party.

At present, for example in the GSM, the status of the B-party is checked over air interface. That is, a message is transmitted over the air interface to the B-subscriber mobile station. If the B-party mobile station receives the message it subsequently signals a response regarding the status thereof back to the network over the air interface.

A single network entity (e.g. the serving call state control function) may provide overall control for a connection. That is, the connection control can be "anchored" to and be provided by a serving network entity. This serving entity could be used to provide information that associates with a connection controlled by said entity. However, the inventors have found that this is not possible in the present network designs where the control functions of the multimedia or any other services may be distributed to be handled by different entities.

The inventors believe that services such as the presence service will become more popular among the users. Thus it must be assumed that the new services are generating a lot of new traffic into core network. The amount of traffic over the air interface generated by the new services may become substantially high and the possibility of overloading the air interface capacity may become a problem especially in the currently proposed 3G systems. Thus the inventors have found that an advantage could be provided if the status inquiry could be arranged to occur such that the inquiry is not transmitted over the air interface to the B-party mobile device as this wastes the limited air interface resources.

Another way of responding these queries could ease the capacity problem. However, the inventors have found that the present network arrangements are not capable of providing the information that is required e.g. by the presence service in such a way that it could readily accessed by an entity requiring the information. The prior art proposes no feasible solution for the storage and dynamic update of the status information and for the provision of this information for clients.

SUMMARY OF THE INVENTION

Embodiments of the present invention aim to address one or several of the above problems.

According to one aspect of the present invention, there is provided a communication system comprising: communication means for providing communication media for a plurality of user equipment; a storage entity adapted to store information that associates with at least one of said user equipment, wherein the storage entity is arranged to receive information from other entities and to associate said received information with a respective user equipment; and at least one service provision entity adapted to serve a client based on information stored in said storage entity.

According to another aspect of the present invention there is provided a server means for a communication system, said server means comprising: interface means for receiving information associated with user equipment adapted for communication via the communication system from at least one element of the communication system; means for dynamically associating the received information with corresponding user equipment; means for storing the information such that the information can be retrieved based on indication of a particular user equipment; and interface means for connection between the server means and at least one service entity, whereby the service entity serves clients based on information from the server means.

According to another aspect of the present invention there is provided a method in a communication system, said communication system providing communication media for a plurality of user equipment, the method comprising the steps of: generating information associated with a user equipment in an entity of the communication system; communicating said information to a storage entity; at the storage entity, receiving and associating said information with the user equipment; and providing information that associates with the user equipment to a service provision entity, whereby the service provision entity is enabled to serve clients based on said information from said storage entity.

The embodiments of the invention may provide an arrangement wherein the clients may readily be provided with information that associates e.g. with the status of a subscriber, communication session and/or an entity of the system. The provision of the information may be centralised in one entity that is functionally separated from those network entities that are required for the provision of communications in the system. The embodiments may also enable secure connections between the information provision service and the clients. The embodiments may also enable arrangement where there is no need to give an access for $3^{rd}$ parties to specific services and/or registries such as the home subscriber server or a location service. Thus the overall security may be improved. The embodiments may enable e.g. network operators to provide a set of better and richer services.

BRIEF DESCRIPTION OF DRAWINGS

For better understanding of the present invention, reference will now be made by way of example to the accompanying drawings in which.

DESCRIPTION OF PREFERRED EMBODIMENTS OF THE INVENTION

Figure 1:
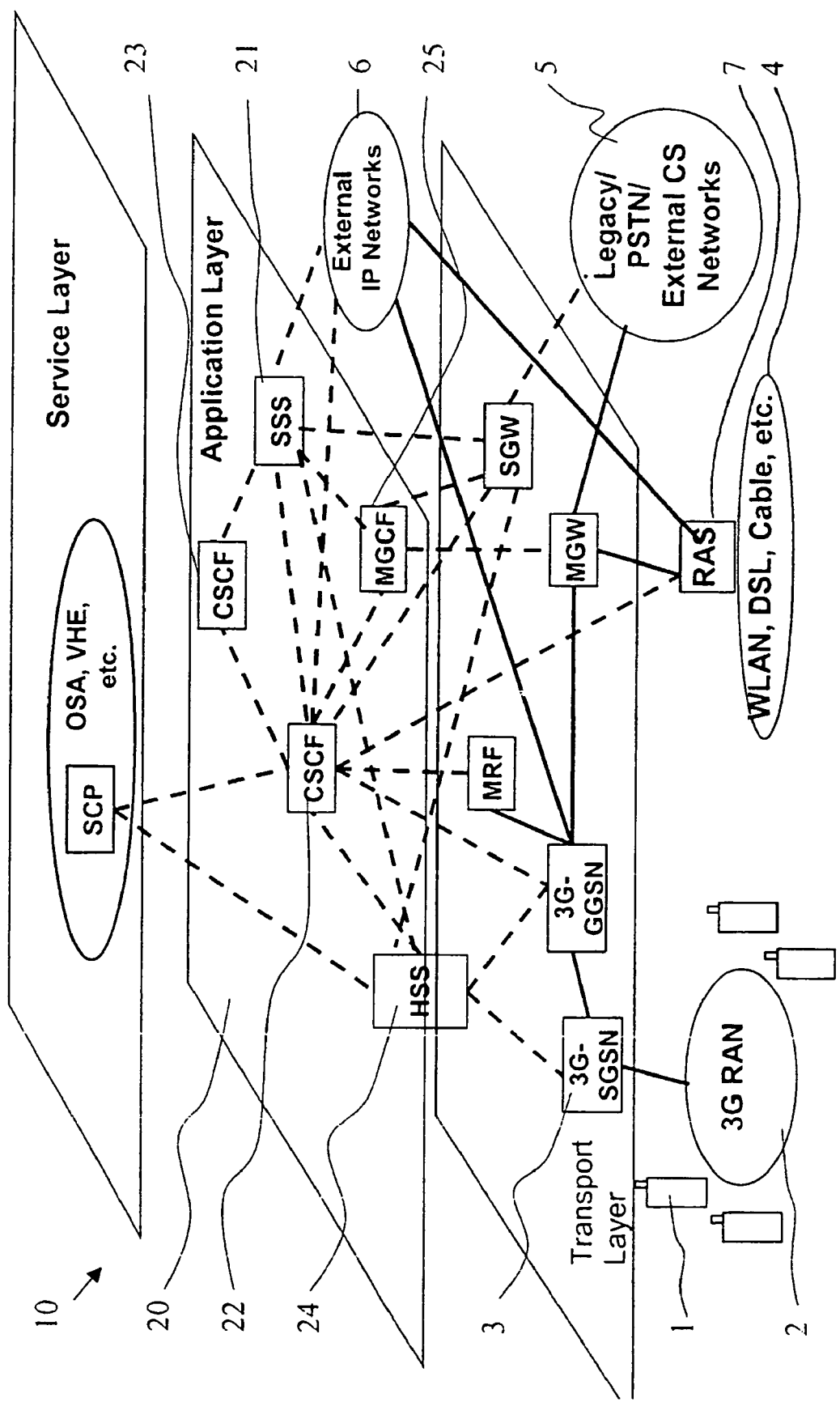
FIG. 1 shows a communication network architecture including a server entity in accordance with an embodiment of the present invention.

Reference is made to FIG. 1 which shows a possible network system architecture including a server entity 21 in accordance with an embodiment of the present invention. The exemplifying network system 10 is arranged in accordance with UMTS 3G specifications. The cellular communication system 10 is arranged such that the apparatus thereof is divided between a radio access network (RAN) 2 and a core network (CN).

In general terms, a communication system can be described by a model in which the functions of the system are divided in several hierarchically arranged function layers. FIG. 1 shows three different function layers, i.e. a service layer, an application layer and a transport layer. The solid lines indicate actual data communication between various entities and networks. The dashed lines indicate signalling traffic between the network entities. The signalling is required for management and/or control functions of the network, such as for call session set-up, charging and so on.

It shall be appreciated that the layered model is shown only in order to illustrate the relationships between the various functions of a data communication system. In a physical i.e. real implementation the entities (e.g. servers or other nodes) are typically not arranged in a layered manner.

A plurality of user equipment 1 is served by a 3G radio access network (RAN) 2 over a wireless interface. Hence the user equipment will be referred to in the following by the term mobile station. The radio access network function is hierarchically located on the transport layer. It shall be appreciated that although FIG. 1 shows only one radio access network for clarity reasons, a typical communication network system comprises a number or radio access networks.

The 3G radio access network (RAN) 2 is shown to be physically connected to a serving general packet radio service support node (SGSN) entity 3. The SGSN 3 is a part of the core network. In the functional model the entity 3 belongs to the transport layer. The operation of a typical cellular network and the various transport level entities thereof is known by the skilled person and will thus not be explained in more detail herein.

An application layer 20 is shown to be located on top of the transport layer. The application layer 20 may include several application level functions. FIG. 1 shows two call state control entities (CSCFs) 22 and 23. From these the call state server 22 is a so called serving call state control function (S-CSCF). That is, the server 22 is currently serving at least one of the mobile stations 1 and is in control of the status or said at least one mobile station.

The application layer is also shown to comprise a home subscriber server (HSS) entity 24 and media gateway control function server entity 25. The home subscriber server HSS 24 is for storing the registration identities (ID) and similar information that relates to the users 1. The home subscriber server can be queried during a session set-up procedures.

In accordance with a preferred embodiment of the present invention the queries are served by a core network entity 21 that is adapted to centrally store the information in the core network. The following description will call this entity as a subscriber status server (SSS).

In FIG. 1 the subscriber status server (SSS) 21 is hierarchically located on the application layer 20. The subscriber status server 21 is adapted to store predefined call and/or subscriber related information. The information preferably includes status information. For example, the subscriber status server 21 may be adapted to dynamically store and provide an indication whether a user is busy or not. The information may be provided for any authorised client requesting for such information. More detailed examples of the operation of the subscriber status server 21 will be discussed with reference to FIGS. 2 and 3.

In the preferred embodiment the subscriber status server entity 21 is adapted to dynamically store information associated with the status of the subscriber. That is, the status server 21 is connected to relevant network entities that provide the server 21 with information based on which the server 21 can provide status information for the clients. The information may be provided for the server 21 either via a direct connection between a network entity and the server or via one or more intermediate nodes. The information provision signalling may be based on any appropriate protocol. Preferably a protocol used by the network entity for communication with at least one other entity is used for the communication with the server 21.

The subscriber status server may receive information from various sources. For example, in FIG. 2 the status server is shown to receive information from two call state control function entities 22 and 23. The serving call state control function S-CSCF may provide information regarding the call state, e.g. whether the caller is busy or available.

The subscriber status server could also receive information related to other activities the user may have. That is, the information does not need to relate to communication sessions the subscriber is involved with. As an example, a subscriber status server may be provided with information that a user is having streaming video connection. This kind of information may be provided e.g. by one of the operator's servers.

Figure 3:
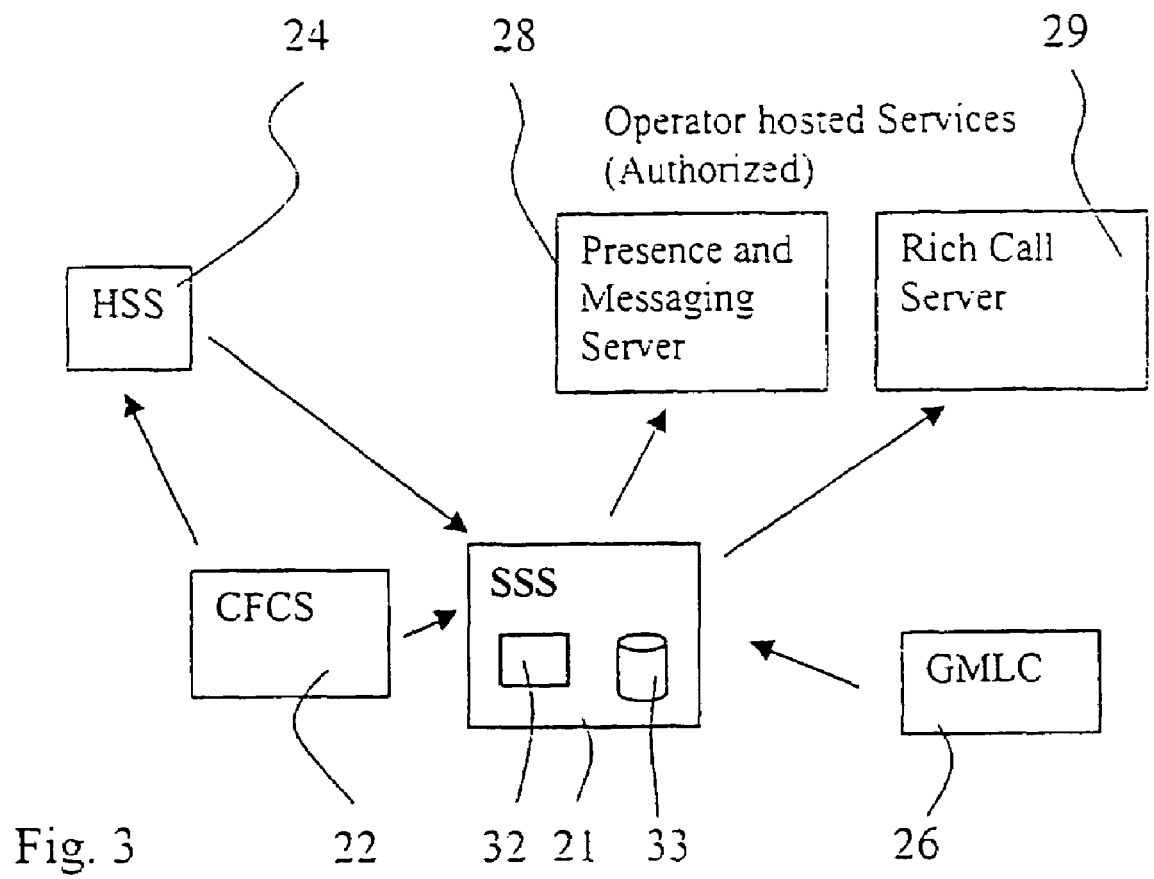

FIG. 3 shows an embodiment where a home subscriber server 24 HSS provided the subscriber status server 21 with information. The HSS information may e.g. indicate whether a certain subscriber is on-line or off-line. The home subscriber server HSS 24 may also provide information regarding the aliases used by the subscriber and so on.

FIG. 3 shows also a gateway mobile location centre GMLC 26 of a location service ALES). The location service may provide information regarding the geographical location of the mobile station. The skilled person is familiar with the location service and it will thus not be explained in any great detail herein. It is sufficient to note that the location service is a service that is arranged to provide geographical location information regarding a mobile station. The modern communication systems are capable of providing a location service. The data based on which the location information is generated may be measured by one or more of elements (not shown) that can be considered to be a part of the communication system or by external sources such as the known GPS (Global Positioning System).

The information is preferably signalled from the various entities towards the status server 21 without any specific information requests by the status server. For example, the serving call state control function 22 may be adapted to signal a message to the status server 21 whenever the status of a mobile station under its control changes.

It is also possible that the status server 21 periodically generates and transmits an inquiry for information. This may be signalled to all predefined entities or only to selected entities. The inquiry may regard a specific mobile station. The inquiry may also be a more general request for information regarding all mobile stations that are currently controlled by Instead of or in addition to the periodic check the status server 21 may also transmit an inquiry to one or more entities in response to an information request from a client.

The subscriber status server 21 may thus receive information from various sources. The server is provided with appropriate processor meals 32 so that it may process the information in order to associate the received information with respective mobile stations.

The information may be stored in appropriate memory means 33. The memory means may operate based on any appropriate arrangement, such as a database, a table, a record, a directory, and so on. The skilled person is familiar with possible means for the provision of the storage function, and these will thus not be described in more detail.

The identification of the mobile stations for the association may be based on, for example, the international mobile subscriber identity (IMSI) code, mobile subscriber integrated digital services number (MSISDN) code or temporary IMSI (TIMSI) code. New type of identifiers consisting of a data network address such as a public address in a SIP URL (Session Initiation Protocol Uniform Resource Locator) or a NAI ULR (network access identifier ULR) may also be used. An example of the first mentioned is 'sip: user@multimedia_operator.com'. The latter could be, for example 'user@domain'.

The subscriber status server 21 may offer the information to one ore more clients. For example, the information may be provided to any operator hosted session initiation protocol (SIP) application network element. The client may be a server such as a presence server (PS) 28 or a rich call server 29 or any other element of the communication system that may find the status information useful.

The information may also be provided to a client such a subscriber. The subscriber may, for example, wish to receive a status of another subscriber. The information may be useful e.g. when making a decision whether to try to make a call to the other subscriber. The subscriber may also wish to receive information regarding the status and location of another subscriber from one source.

It is also possible to arrange the location services to operate such that instead of querying the location service node 26, the subscriber may request location information from the subscriber status server 21 or from the presence server 28. Some operators or subscribers may find this type of operation useful e.g. due to security and/or usability reasons.

The information may be provided on request by the client. Alternatively, the status server 21 may provided the information periodically e.g. based on a timer function 31 implemented in the server. The information may also be provided in response to an event. For example, the information provision may be triggered by a message from the call state control function 22 indicative of a change in the status of a specified user equipment.

The signalling between the subscriber status server 21 and clients may be based on a protocol or protocols that are already used by the clients. For example, without limiting to these, the information may be signalled based on protocols such as the SIP, LDAP (lightweight directory access protocol), HTTP/XML or HTTP/HTML and so on. Signalling with clients such as the mobile station 1 is advantageously but not necessarily based on a protocol the mobile station is already adapted to use. A protocol that has been designed especially for the presence service may also be employed for the signalling.

Figure 2:
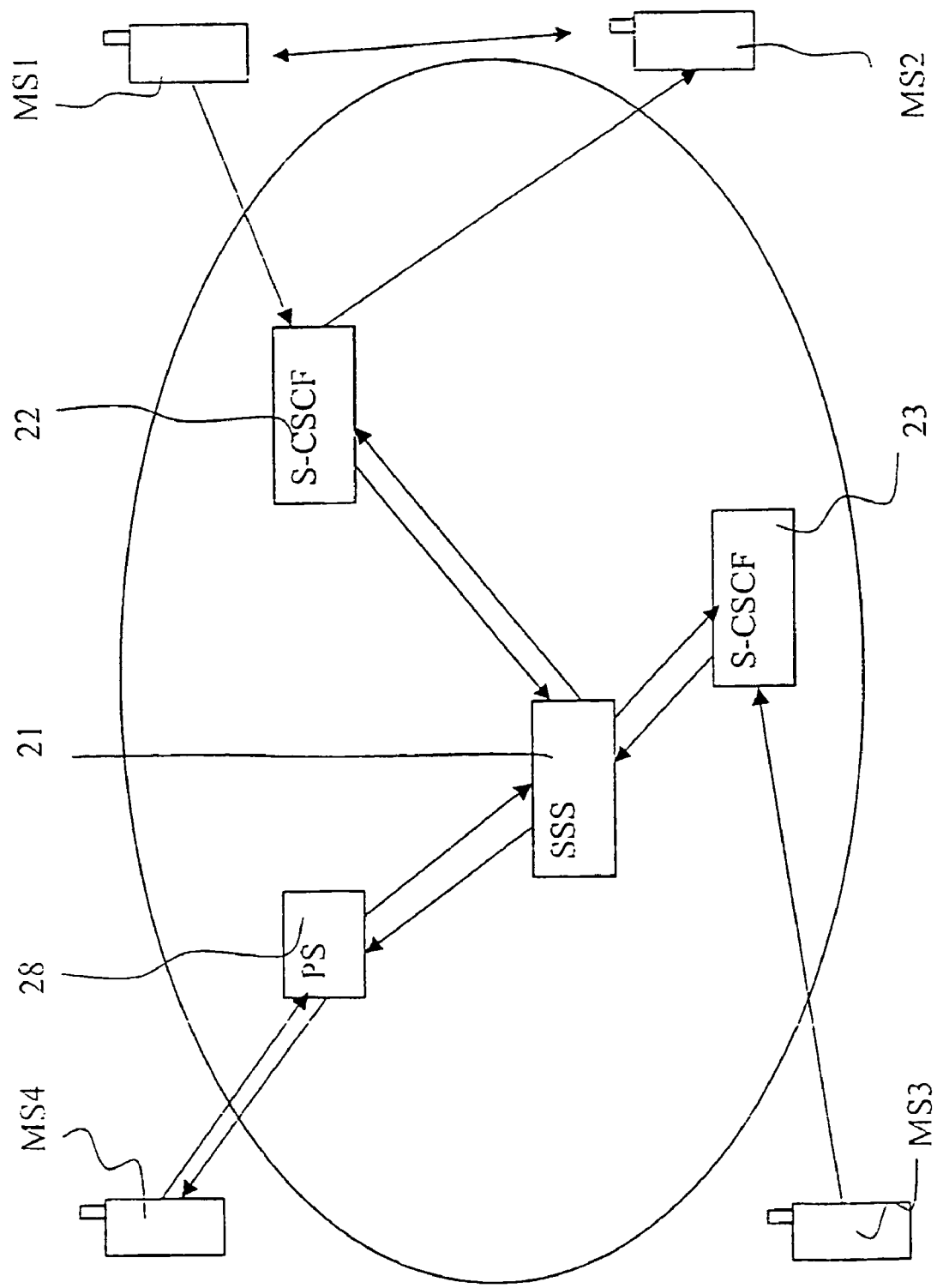
FIGS. 2 and 3 illustrate signalling between various entities of a communication system in accordance with a first and a second embodiment of the present invention.

FIG. 2 illustrates signalling for two exemplifying scenarios in which the information provided by the status server 21 can be useful. These scenarios are explained for a situation where mobile stations MS1 and MS2 are already having an established communication connect-on via appropriate network elements. This communication connection is indicated by the two headed arrow 30 between the stations MS1 and MS2. The communication is controlled by call state control function 22.

In the first scenario a mobile station MS3 intends to make a call to the mobile station MS2. The control entity 22 has informed the status server 21 of the existing call between the stations MS1 and MS2. Before the controller entity 23 continues further with the call set-up signalling to establish a call between stations MS3 and MS2, in sends an inquiry to the status server 21. The status server 21 responds with an indication that the stations MS2 is busy. Based on this indication the control entity 23 may stop the call set-up procedure and signal an indication for the mobile station MS3 that the mobile station MS2 is busy.

In another scenario the user of a mobile station MS4 wants to receive information regarding the status of the mobile station MS2. The user transmits a request for the status information to a presence server entity 28. The presence server may then request for the information further from, the status server 21. As above, the control entity 22 has informed the status server 21 of the existing call between the stations MS1 and MS2. Thus the status server 21 responds with an indication that the stations MS2 is busy. Based on this indication the presence server may signal an indication for the mobile station MS4 that the mobile station MS2 is busy.

Figure 4:
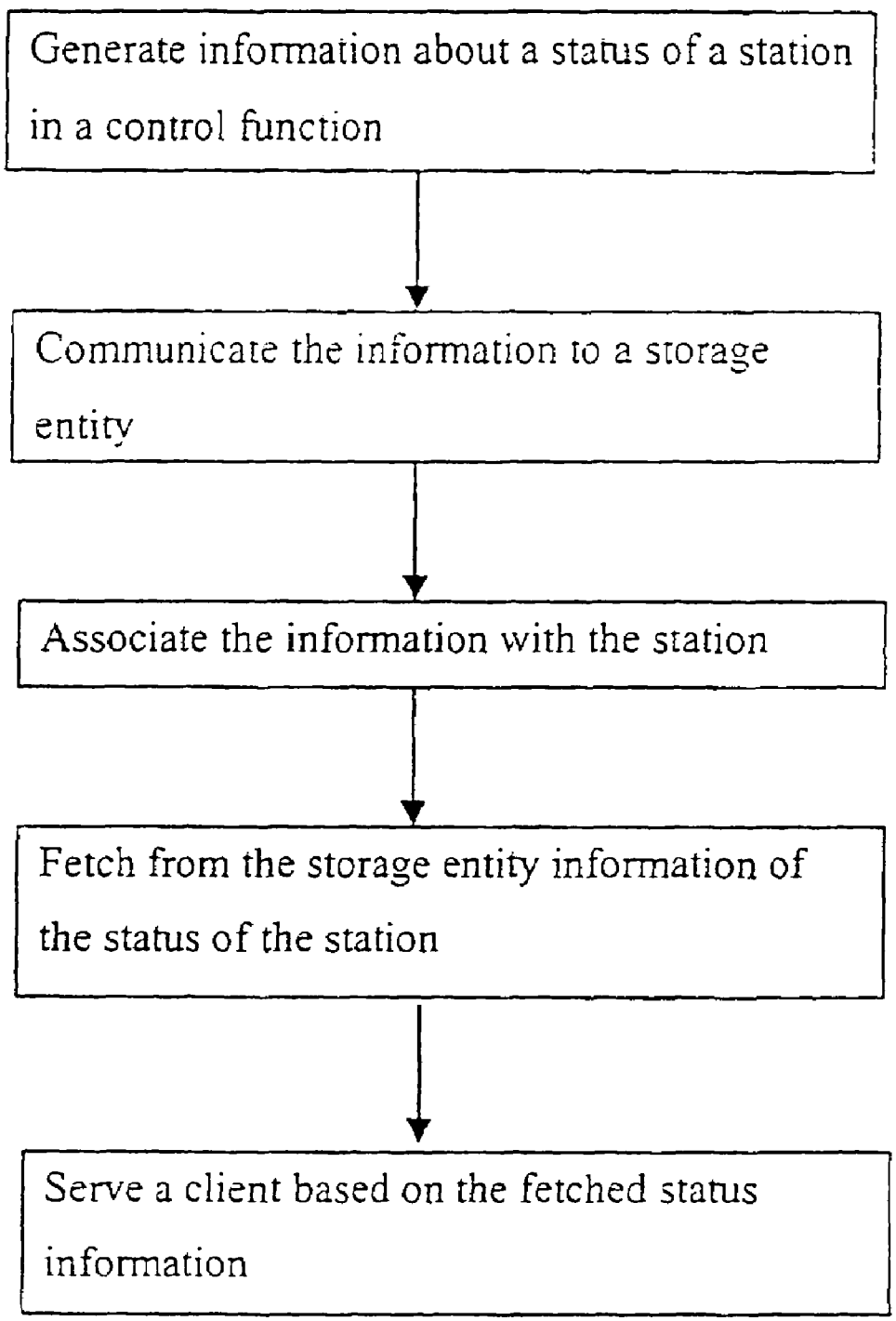
FIG. 4 is a flowchart illustrating the operation of one embodiment of the present invention.

The above operation is also illustrated by the flowchart of FIG. 4.

The subscriber status server function entity may be integrated with a call state control function entity CSCF. Alternatively, as shown by FIG. 2, the subscriber status server function may be located in a separate server entity 21. The separately located server may be provided with direct or indirect access to other entities, such as to the call state control function entity 22, home subscriber server 24, gateway mobile location centre (GMLC) 26, and application servers.

The operators may find the information provided by the status server 21 useful since it enables the communication network operators to offer e.g. better presence service than what the more conventional service providers (such as the internet search engine providers) are capable of offering.

The subscriber status server may be located behind a secure interface. The interface may be provided by a security server between the application requesting the status information and the subscriber status server. The subscriber status server itself may be adapted to offer a secure interface to trusted parties. The secure interfaces may be based on standardised secure interfaces.

The communication network system may be connected to several other networks, such as networks 4 to 6 of FIG. 1. These connections may be provided by means of appropriate gateway nodes 7. The provision of these connections as such is not an essential part of the invention and will not be described in more detail herein.

The external networks may also communicate with function entities or the network 10 that are implemented on the layers on top of the transport layer. The communication signalling may occur either directly between an entity of the external network and an entity e.g. in the application layer or via an appropriate signalling gateway (SGW). Thus the application layer subscriber status server 21 may also serve entities that are a part of external communication systems or other clients that access the communication system via an external network.

The data to be communicated by means of an active connection may be so called packet data. In alternative embodiments of the invention the data may be sent in any suitable format. Correspondingly, the above referenced to packet switched systems but any other appropriate communication system may also be used. The embodiments are intended to run on top of a data communication system, such as a packet data system. Thus it shall be understood that the selection of the data communication system is not of essential as the data communication system is for the transport for e.g. multimedia (SIP protocol) signalling.

The embodiments may enable the operators to have better and richer service set e.g. an improved presence service. There is no need to give $3^{rd}$ party access to any other entities to the communication systems, such as the home subscriber server or the location service entities since the relevant information is stored in the subscriber status server. The subscriber status server may be assigned to have the sole responsibility or responding to any status enquiries.

The embodiments or the present invention has been described the context of a 3G UMTS system. This invention is also applicable to any other standard where similar advantages may be obtained. For example, the embodiments are applicable for any system defined by the internet Engineering Task Force (IETF) or any other standardisation body. The network system may also be, for example, based on a local area network (LAN), wireless LAN (WLAN), a cable network, a xDSL based network, a GSM based system or any other network that is based on dial-up networking.

It should be appreciated that whilst embodiments of the present invention have been described in relation to mobile stations, embodiments of the present invention are applicable to any other suitable type of user equipment.

The above describes in detail a subscriber status server entity. However any entity in the network, such as the home subscriber server nay be adapted to act as the subscriber status server.

It is also noted herein that while the above describes exemplifying embodiments of the invention, there are several variations and modifications which may be made to the disclosed solution without departing from the scope of the present invention as defined in the appended claims.

The invention claimed is:

1. A communication system, comprising:
communication network for providing communication media for a plurality of user equipment;
a storage entity configured to store information associated with a connection status of the plurality of user equipment, the storage entity being arranged to receive connection status information from other entities, associate said received connection status information with a respective user equipment, dynamically store an indication of whether each of said plural user equipment is busy and provide one of said indications for a user equipment to a client service or service provision entity when a request is received from the client service entity without forwarding the request to said user equipment; and at least one service provision entity configured to serve a client based on said information stored in said storage entity.

2. The communication system of claim 1, wherein the connection status information comprises the connection status of the user equipment.

3. The communication system of claim 1, wherein the connection status information comprises information about a state of a communication session.

4. The communication system of claim 1, wherein the connection status information comprises an indication of whether the plurality of user equipment has an active connection at a given moment.

5. The communication system of claim 1, wherein said other entities are configured to provide at least one of a subscriber server function, a call state control function and a location service function.

6. The communication system of claim 1, wherein an update of the information stored in the storage entity is arranged to occur dynamically.

7. The communication system of claim 1, wherein the at least one service provision entity comprises an application server.

8. The communication system of claim 1, wherein the at least one service provision entity is configured to provide presence information.

9. The communication system of claim 1, wherein the at least one service provision entity is configured to provide an instant messaging service.

10. The communication system of claim 1, wherein the at least one service provision entity is configured to provide a rich call service.

11. The communication system of claim 1, wherein an interface between the storage entity and the at least one service provision entity is based on protocol that the at least one service provision entity uses for communication with at least one other entity.

12. The communication system of claim 1, wherein communication between the storage entity and the at least one service provision entity is protected by a security function.

13. The communication system of claim 1, wherein a user equipment may have more than one session occurring at an identical moment in time and wherein at least two of said sessions are controlled by different network entities.

14. The communication system of claim 1, wherein the storage entity is configured to receive connection status information associated with the connection status of a user equipment from at least two different sources.

15. The communication system of claim 1, wherein the client is one of the plurality of user equipment.

16. The communication system of claim 1, wherein the at least one service provision entity is located in a first network and the client is located in a second network.

17. The communication system of claim 1, wherein the storage entity and the at least one service provision entity belong to different networks.

18. The communication system of claim 1, wherein at least one of the plurality of user equipment comprises a mobile station.

19. The server means of claim 18, wherein the server means is configured to provide connection status information about user equipment based on connection status information received from a plurality of elements of the communication system.

20. The communication system of claim 1, wherein the information stored in the storage entity comprises information associated with a geographical location of the plurality of user equipment.

21. A server means for a communication system, said server means comprising:

interface means for receiving connection status information associated with a plurality of user equipment configured for communication via the communication system from at least one element of the communication system;

means for dynamically associating the received connection status information with corresponding user equipment;

means for dynamically storing an indication of whether each of said user equipment is busy such that the information can be retrieved based on an indication of a particular user equipment when a request is received without forwarding the request to a particular user equipment; and interface means for connection between the server means and at least one service entity, whereby the at least one service entity serves clients based on connection status information from the server means.

22. A method in a communication system, said communication system providing communication media for a plurality of user equipment, the method comprising the steps of:

generating connection status information associated with one of the plurality of user equipment in an entity of the communication system;

communicating said connection status information to a storage entity that is configured to dynamically store an indication of whether said user equipment is busy;

receiving and associating, at the storage entity, said connection status information with the one of the plurality of user equipment; and providing connection status information that is associated with the one of the plurality of user equipment to a service provision entity when a request is received, whereby the service provision entity is enabled to serve clients based on said connection status information from said storage entity without forwarding the request to one of said plural user equipment.

* * * * *